United States Patent
Yeoh et al.

(10) Patent No.: US 11,050,827 B1
(45) Date of Patent: Jun. 29, 2021

(54) METHOD AND DEVICE FOR IDENTIFYING SUSPICIOUS OBJECT MOVEMENTS BASED ON HISTORICAL RECEIVED SIGNAL STRENGTH INDICATION INFORMATION ASSOCIATED WITH INTERNET-OF-THINGS DEVICES

(71) Applicant: MOTOROLA SOLUTIONS, INC., Chicago, IL (US)

(72) Inventors: Hong Shiong Yeoh, Taiping (MY); Kah Jing Lee, Kulim (MY); Yew Tatt Sim, Butterworth (MY); Pei See Toh, Bayan Lepas (MY); Margaret Lee Hing Choo, Bandar Baru Air Itam (MY); Li Poh Chen, Butterworth (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 84 days.

(21) Appl. No.: 16/702,858

(22) Filed: Dec. 4, 2019

(51) Int. Cl.
| | |
|---|---|
| *H04L 29/08* | (2006.01) |
| *G08B 13/24* | (2006.01) |
| *G08B 25/10* | (2006.01) |
| *H04W 4/38* | (2018.01) |

(Continued)

(52) U.S. Cl.
CPC .............. *H04L 67/12* (2013.01); *G06F 40/40* (2020.01); *G08B 13/2494* (2013.01); *G08B 25/10* (2013.01); *H04L 12/282* (2013.01); *H04W 4/38* (2018.02); *H04L 2012/2849* (2013.01)

(58) Field of Classification Search
CPC ............... H04L 67/12; H04L 12/282; H04L 2012/2849; H04W 4/38; G06F 40/40; G08B 13/2494; G08B 25/10
See application file for complete search history.

(56) References Cited

U.S. PATENT DOCUMENTS

| | | |
|---|---|---|
| 6,640,132 B1 | 10/2003 | Freeman et al. |
| 8,959,190 B2 | 2/2015 | Kiley et al. |
| 8,998,084 B2 | 4/2015 | Mcintyre |

(Continued)

FOREIGN PATENT DOCUMENTS

| | | |
|---|---|---|
| CA | 2800784 | 1/2011 |
| CN | 105206059 A | 12/2015 |

(Continued)

*Primary Examiner* — Sisay Yacob
(74) *Attorney, Agent, or Firm* — Raguraman Kumaresan

(57) ABSTRACT

A process of identifying suspicious object movements in an incident location. An electronic computing device obtains incident information identifying a time of occurrence and a location of an incident. The electronic computing device identifies internet-of-things (IoT) devices deployed in the incident location and accesses received signal strength indication (RSSI) information associated with a selected IoT device. The RSSI information includes historical RSSI values that were captured at the IoT device during the time of occurrence of the incident. The electronic computing device generates a suspicious object movement pattern corresponding to the at least one IoT device based on variations within the historical RSSI values that were captured at the at least one IoT device during the first time period. A display or audio output device provides a corresponding visual or audio output indicating the suspicious object movement pattern corresponding to the IoT device.

20 Claims, 8 Drawing Sheets

(51) Int. Cl.
*H04L 12/28* (2006.01)
*G06F 40/40* (2020.01)

(56) References Cited

U.S. PATENT DOCUMENTS

| | | | |
|---|---|---|---|
| 10,127,705 B2 | 11/2018 | Lim et al. | |
| 10,217,287 B2 | 2/2019 | Lim et al. | |
| 10,419,442 B2 * | 9/2019 | Poli | H04W 4/023 |
| 2005/0101334 A1 | 5/2005 | Brown et al. | |
| 2016/0308865 A1 * | 10/2016 | Poli | H04W 64/00 |
| 2019/0312985 A1 | 10/2019 | Yeap et al. | |

FOREIGN PATENT DOCUMENTS

| | | |
|---|---|---|
| WO | 2015102713 A1 | 7/2015 |
| WO | 2016172050 A1 | 10/2016 |

\* cited by examiner

METHOD AND DEVICE FOR IDENTIFYING SUSPICIOUS OBJECT MOVEMENTS BASED ON HISTORICAL RECEIVED SIGNAL STRENGTH INDICATION INFORMATION ASSOCIATED WITH INTERNET-OF-THINGS DEVICES

BACKGROUND OF THE INVENTION

During an incident investigation, public safety professionals such as first responders, crime-scene investigators, medical examiners, evidence specialists etc., show up at the incident scene and work together to solve the incident. Securing the incident scene, interviewing the witnesses, documenting the incident scene in detail, and collecting physical evidences are some of the essential functions performed at the incident scene. Documenting the incident scene also involves photographing the crime scene, measuring the objects at the vicinity of the incident scene, and noting the position and orientation of the different objects at the scene.

Each piece of evidence is crucial and has a special value in an investigation. A piece of evidence such as a fingerprint collected, for example, from a refrigerator door may positively establish a person as having been at the scene. Also, physical evidences capturing abnormal change in the position and/or orientation of the objects (e.g., doors, furniture, and appliances) at the crime scene may also provide valuable clue regarding the physical presence, for example, of an intruder at the time of the incident. However, intruders do not always leave traces of their presence at the incident scene. For example, when an intruder has carefully moved back the objects to the initial location or when the change in the position and/or orientation of the objects are not significant, investigators may fail to establish the presence of an intruder at a particular area of the scene unless other physical evidences link the presence of the intruder to the scene.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
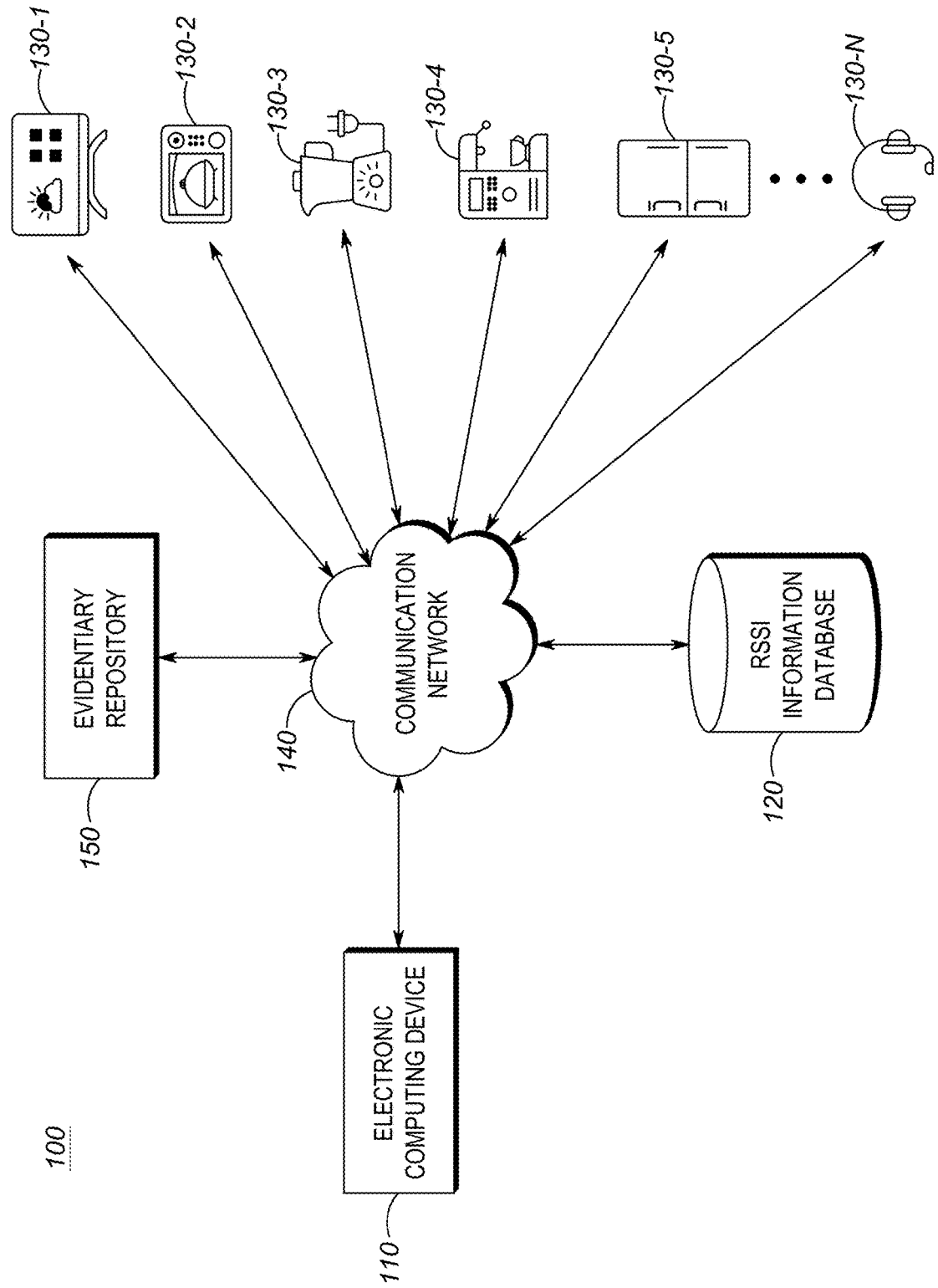
FIG. 1 is a system diagram illustrating a system of identifying suspicious object movements in an incident location in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Investigators may use physical evidence collected from the incident scene and information gathered from the witnesses to identify the specific areas (e.g., kitchen area, basement etc.,) of the incident scene that an intruder might have entered and/or specific objects (e.g., home furniture and appliances) at the incident scene that the intruder might have touched or moved at the time of the incident. As an example, a photographic evidence of a scene that captures an open filing cabinet with several documents scattered on the floor may indicate that the intruder has probably entered the room and went through the documents in the filing cabinet. However, in some cases, intruders do not leave any trace of their presence at the crime scene. In such cases, it is possible that the investigators may not find any physical evidence at the crime scene to establish the areas within the incident scene that intruders might have entered and/or the objects that intruders might have intentionally or unintentionally moved at the time of the incident. Accordingly, there is a technological need to electronically capture information identifying suspicious object movements that historically took place at the time of the incident even if physical evidences collected from the incident scene do not readily establish movement of objects at the time of the incident.

One embodiment provides a method of identifying suspicious object movements in an incident location. The method includes: obtaining, at an electronic computing device, incident information related to an incident, the incident information identifying a time of occurrence of the incident and a location of the incident; identifying, at the electronic computing device, a plurality of internet-of-things (IoT) devices deployed in the location of the incident; selecting, at the electronic computing device, from the plurality of IoT devices, at least one IoT device that is deployed within a first area of the location of the incident;

accessing, at the electronic computing device, received signal strength indication (RSSI) information associated with the at least one IoT device, the RSSI information including a plurality of historical RSSI values that were captured at the at least one IoT device during a first time period relative to the time of occurrence of the incident; generating, at the electronic computing device, a suspicious object movement pattern corresponding to the at least one IoT device based on variations within the historical RSSI values that were captured at the at least one IoT device during the first time period; and causing, at the electronic computing device, a display or audio output device to provide a corresponding visual or audio output indicating the suspicious object movement pattern corresponding to the at least one IoT device.

A further embodiment provides an electronic computing device including a communication interface; and an electronic processor communicatively coupled to the communication interface. The electronic processor is configured to: obtain incident information related to an incident, the incident information identifying a time of occurrence of the incident and a location of the incident; identify a plurality of internet-of-things (IoT) devices deployed in the location of the incident; select, from the plurality of IoT devices, at least one IoT device that is deployed within a first area of the location of the incident; access received signal strength indication (RSSI) information associated with the at least one IoT device, the RSSI information including a plurality of historical RSSI values that were captured at the at least one IoT device during a first time period relative to the time of occurrence of the incident; generate a suspicious object movement pattern corresponding to the at least one IoT device based on variations within the historical RSSI values that were captured at the at least one IoT device during the first time period; and cause a display or audio output device to provide a corresponding visual or audio output indicating the suspicious object movement pattern corresponding to the at least one IoT device.

Each of the above-mentioned embodiments will be discussed in more detail below, starting with example system and device architectures of the system in which the embodiments may be practiced, followed by an illustration of processing steps for achieving the method of identifying suspicious object movements in an incident location. Further advantages and features consistent with this disclosure will be set forth in the following detailed description, with reference to the figures.

Referring now to the drawings, and in particular FIG. 1, which depicts a schematic view of a system 100 including an electronic computing device 110 that is configured to identify suspicious object movements in an incident location. The system 100 further includes an RSSI information database 120 that, periodically or in response to a trigger event, obtains and stores received signal strength indication (RSSI) information associated with a plurality of internet-of-things (IoT) devices 130-1 through 130-n deployed in one or more locations. The plurality of IoT devices 130-1 through 130-n can be interchangeably referred to, collectively, as IoT devices 130, and generically as a IoT device 130. In accordance with embodiments, the IoT devices 130 include electronic devices that are configured with radio frequency transmitters and receivers to exchange signals to and from other network devices and IoT devices 130 operating in a communication network 140. As shown in FIG. 1, the plurality of IoT devices 130 may include, but are not limited to a smart television (i.e., IoT device 130-1), an oven (i.e., IoT device 130-2), a juicer (i.e., IoT device 130-3), a coffee machine (i.e., IoT device 130-4), a refrigerator (i.e., IoT device 130-4), and a headset (i.e., IoT device 130-n). These are non-limiting examples, and as such, the plurality of IoT devices 130 may include any combination of commercial and consumer electronic products including items such as washing machines, printers, laptops, industrial machines, robots, drones, heaters, air conditioners, surveillance cameras, sensor devices, rice cookers, dishwashers, and the like.

The RSSI information associated with an IoT device 130 includes a plurality of historical RSSI values that were captured at the IoT device 130. The RSSI information associated with a particular IoT device 130 is stored at the RSSI information database 120 along with an identifier of the IoT device 130 at which the RSSI information was captured. The historical RSSI values may correspond to estimated signal strength values corresponding to signals received, for example, periodically from a wireless router (e.g., Wi-Fi router) with which the IoT device 130 is associated in order to communicate with other network devices and other IoT devices 130 operating in the network 140. Each historical RSSI value is mapped to a particular timestamp to identify the time at which the corresponding RSSI value was captured at the IoT device 130.

In accordance with some embodiments, a user may pre-register the IoT devices 130 available at the location (e.g., a household) with the RSSI information database 120 in order to provide permission to the RSSI information database 120 to periodically (or in response to a trigger event) obtain and store RSSI information including historical RSSI values respectively captured by each of the registered IoT devices 130. When an incident (e.g., a break-in or burglary incident) is reported at an incident scene (e.g., a house), a public safety officer such as a crime scene investigator may operate the electronic computing device 110 to readily access the RSSI information associated with one or more of the IoT devices 130 that are located at the incident scene from the RSSI information database. In these embodiments, the electronic computing device 110 may be configured to obtain permission from the user of the IoT devices 130 before accessing the RSSI information associated with the IoT devices 130 from the database 120. In one embodiment, the RSSI information database 120 may be implemented locally at the site (e.g., household) in which the IoT devices 130 are deployed. In another embodiment, the RSSI information database 120 may be implemented at a cloud server (not shown) through which the RSSI information associated with IoT devices 130 deployed at a particular location is accessible to authorized public safety agencies.

In accordance with embodiments, the electronic computing device 110 is a device that is authorized (e.g., by a public safety agency) to access RSSI information associated with one or more IoT devices 130 that are deployed at a particular location (e.g., an incident scene) when an incident is reported. For example, the electronic computing device 110 may correspond to a communication device, operated by a public safety officer, such as a battery-powered portable radio used for narrowband and/or broadband direct-mode or infrastructure communications. The electronic computing device 110 is configured to access RSSI information including historical RSSI values that were captured at the IoT device 130 during a particular time period relative to the time of occurrence of the incident. In accordance with embodiments, the electronic computing device 110 access RSSI information either from the RSSI information database 120 or directly from the one or more IoT devices 130 deployed in an incident location. In one embodiment, the system 100 further includes an authentication server (not shown) that manages access to RSSI information associated with particular IoT devices 130 deployed in a location. In this embodiment, the electronic computing device 110 authenticates itself to the authentication server in order to access RSSI information associated with a particular set of IoT devices 130. In one embodiment, the electronic computing device 110 transmits a request to the RSSI information database 120 to obtain access to the RSSI information. The request includes information related to an identifier (e.g., device identifier) of the IoT device 130, a particular time period (i.e., a time period overlapping with the time of occurrence of the incident) corresponding to which the captured RSSI information needs to be accessed, and credential (security certificate, authentication key etc.,) of the electronic computing device 110. In response to the request, the RSSI information database 120 may check the credential of the electronic computing device 110, for example, by communicating with an authentication server. If the credential is valid, the RSSI information database 120 transmits and/or provides access to the RSSI information associated with the IoT devices 130 as requested by the electronic computing device 110.

In accordance with some embodiments, the electronic computing device 110 may connect to the communication network 140 that is controlled and operated by a public-safety agency to facilitate secure communication between the electronic computing device 110, RSSI information database 160, and IoT devices 130. Wired or wireless air-interface communication links communicatively couple the electronic computing device 110, RSSI information database 120, IoT devices 130, evidentiary repository 150 via the communication network. The communication network 140 may include a wired or wireless network, or a combination of wired and wireless networks, or any public safety network (e.g., land mobile radio (LMR) network, long-term evolution (LTE) network, etc.,) operated by a government or private organization.

In accordance with some embodiments, the electronic computing device 110 obtains incident information related to a reported incident, for example, from a dispatch computer and/or from conversations between a public safety officer responding to an incident and a potential witness to the incident. The incident information includes information identifying a time of occurrence of the incident and a location of the incident. The electronic computing device 110 identifies a plurality of IoT devices 130 that are deployed in the incident location and selects one or more of the IoT devices 130 based on particular areas within the incident scene that need to be analyzed for suspicious object movements. For example, the electronic computing device 110 may process the conversations between the public safety officer and a witness of the incident to identify a specific event (e.g., a loud sound) that occurred during the incident at an identified area (e.g., basement of a house) in the incident location. In this case, the electronic computing device 110 may select IoT devices 130 that are available at the identified area in the incident location for further processing of the RSSI information associated with the selected IoT devices 130. The electronic computing device 110 then accesses RSSI information including a plurality of historical RSSI values that were captured at the selected one or more of the IoT devices 130 during a time period relative to the time of occurrence (e.g., a time period during which noises were heard from the basement of the house) of the incident. The electronic computing device 110 then generates a suspicious object movement pattern corresponding to the selected one or more of the IoT devices 130 based on variations within the historical RSSI values that were captured at the selected one or more IoT devices 130 during the time period. The electronic computing device 110 then causes a display or audio output device to provide a corresponding visual or audio output indicating the suspicious object movement pattern corresponding to the IoT device 130.

In accordance with some embodiments, the electronic computing device 110 generates a suspicious object movement pattern corresponding to each IoT device 130 that is deployed at the location of the incident or alternatively each IoT device 130 that is selected based on incident information or user input. The electronic computing device 110 may further store information corresponding to the generated suspicious object movement pattern at an evidentiary repository 150 for further processing and investigation by the public safety agency. The information stored at the evidentiary repository 150 may include an incident identifier, historical RSSI values used to generate the suspicious object movement pattern, time stamp at which the suspicious object movement was seen, identifier of the IoT device 130 corresponding to which the suspicious object movement pattern was identified, location information identifying a specific area or sub-area in which the IoT device 130 was deployed, type of suspicious object movement pattern selected from one of (i) IoT device 130 movement pattern or (ii) an unidentified object (e.g., a person or an object other than an IoT device) movement relative to an IoT device 130. The evidentiary repository 150 may also store other digital evidences linked to the incident identifier. The evidentiary repository 150 may be hosted at a cloud server.

Figure 2:
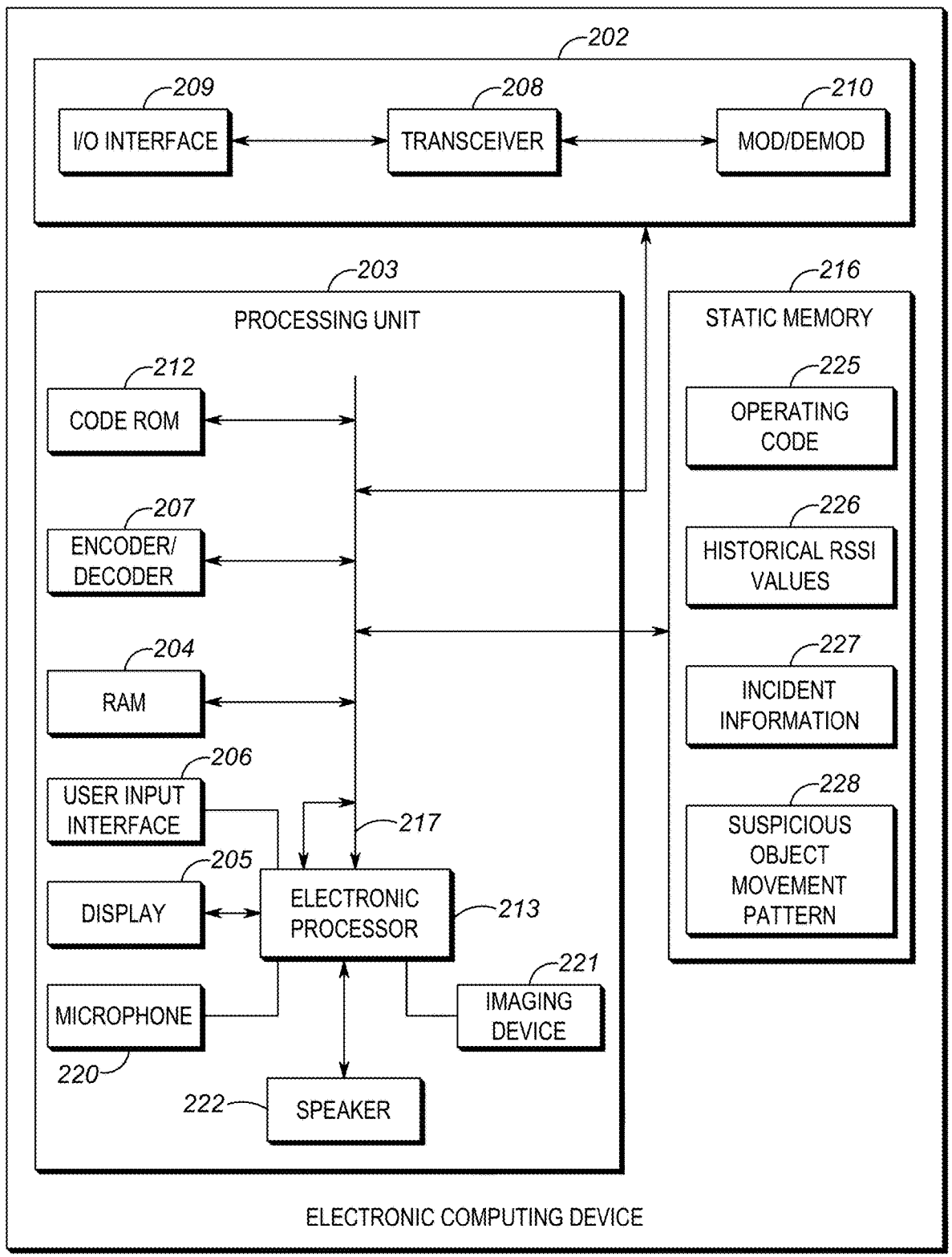
FIG. 2 is a device diagram showing a device structure of an electronic computing device employed in the system of FIG. 1 in accordance with some embodiments.

Now referring to FIG. 2, a schematic diagram illustrates an electronic computing device 200 according to some embodiments of the present disclosure. The electronic computing device 200 performs the functions of the electronic computing device 110 shown in FIG. 1, and may be embodied in one or more electronic communication devices operated by public-safety agencies, or some other communication device not illustrated in FIG. 1, and/or may be a distributed communication device across two or more of the foregoing (or multiple of a same type of one of the foregoing) and linked via a wired and/or wireless communication link(s).

While FIG. 2 may represent the devices as described above with respect to FIG. 1, depending on the type of the device, the electronic computing device 200 or other devices may include fewer or additional components in configurations different from that illustrated in FIG. 2. For example, in some embodiments, the electronic computing device 200 acting as an infrastructure controller may not include one or more of the screen 205, microphone 220, imaging device 221, and speaker 222. As another example, in some embodiments, the electronic computing device 200 acting as a communication device operated by a public safety officer may include one or more of the screen 205, microphone 220, imaging device 221, and a speaker 22. Other combinations are possible as well.

As shown in FIG. 2, the electronic computing device 200 includes a communications unit 202 coupled to a common data and address bus 217 of a processing unit 203. The electronic computing device 200 may also include one or more input devices (for example, keypad, pointing device, touch-sensitive surface, button, a microphone 220, an imaging device 221, and/or a user input interface device 206) and an electronic display screen 205 (which, in some embodiments, may be a touch screen and thus also acts as an input device), each coupled to be in communication with the processing unit 203.

An audio and/or video capture device (microphone 220 and/or imaging device 221) is implemented at the electronic computing device 200 for capturing real-time digital audio and/or video stream from a user. For example, the microphone 220 may be present for capturing audio from a user operating the device 200 and/or other environmental or background audio and/or is transmitted as voice or audio stream data, or as acoustical environment indications, by communications unit 202 to other portable radios and/or other communication devices. As another example, the microphone 220 may be used to record conversations between a public safety officer and witness corresponding to an incident. In accordance with some embodiments, the recorded conversations may be processed by the electronic computing device to extract incident information identifying time and/or location of occurrence of a specific event associated with an incident. The imaging device 221 provides video (still or moving images) of the electronic computing device 200 for further processing by the processing unit 203 and/or for further transmission by the communications unit 202. For example, the imaging device 221 may be used to capture photographic evidence identifying the current position and orientations of the IoT devices 130 deployed in an incident location. A speaker 222 may be present for reproducing audio that is decoded from voice or audio streams of calls received via the communications unit 202 from other portable radios, electronic media devices, from digital audio stored at the electronic computing device 200, from other ad-hoc or direct mode devices, and/or from an infrastructure RAN device, or may playback alert tones or other types of pre-recorded audio. In accordance with some embodiments, the speaker 222 (also referred herein as an audio output device) provides an audio output indicating the suspicious object movement pattern that is generated corresponding to one or more IoT devices 130.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (IO) interfaces 209 that are configurable to communicate with other communication devices, such as the RSSI information database 120, IoT devices 130, and evidentiary repository 150. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210 that is coupled to an encoder/decoder 207 of the processing unit 203.

The one or more electronic processors 213 (also referred to herein as a microprocessor 213) has ports for coupling to the display screen 205, the microphone 220, the imaging device 221, the user input interface device 206, and/or the speaker 222. Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. In one embodiment, the static memory 216 further stores historical RSSI values 226 associated with one or more IoT devices 130 obtained from the RSSI information database 120, incident information 227 associated with an incident being investigated, and suspicious object movement pattern 228 that is generated based on variations within RSSI values associated with one or more IoT devices 130.

In examples set forth herein, the electronic computing device 200 is not a generic computing device, but a device that specifically comprises a computer executable engine configured to implement functionality of identifying suspicious object movements based on historical RSSI information associated with IoT devices 130.

Figure 3:
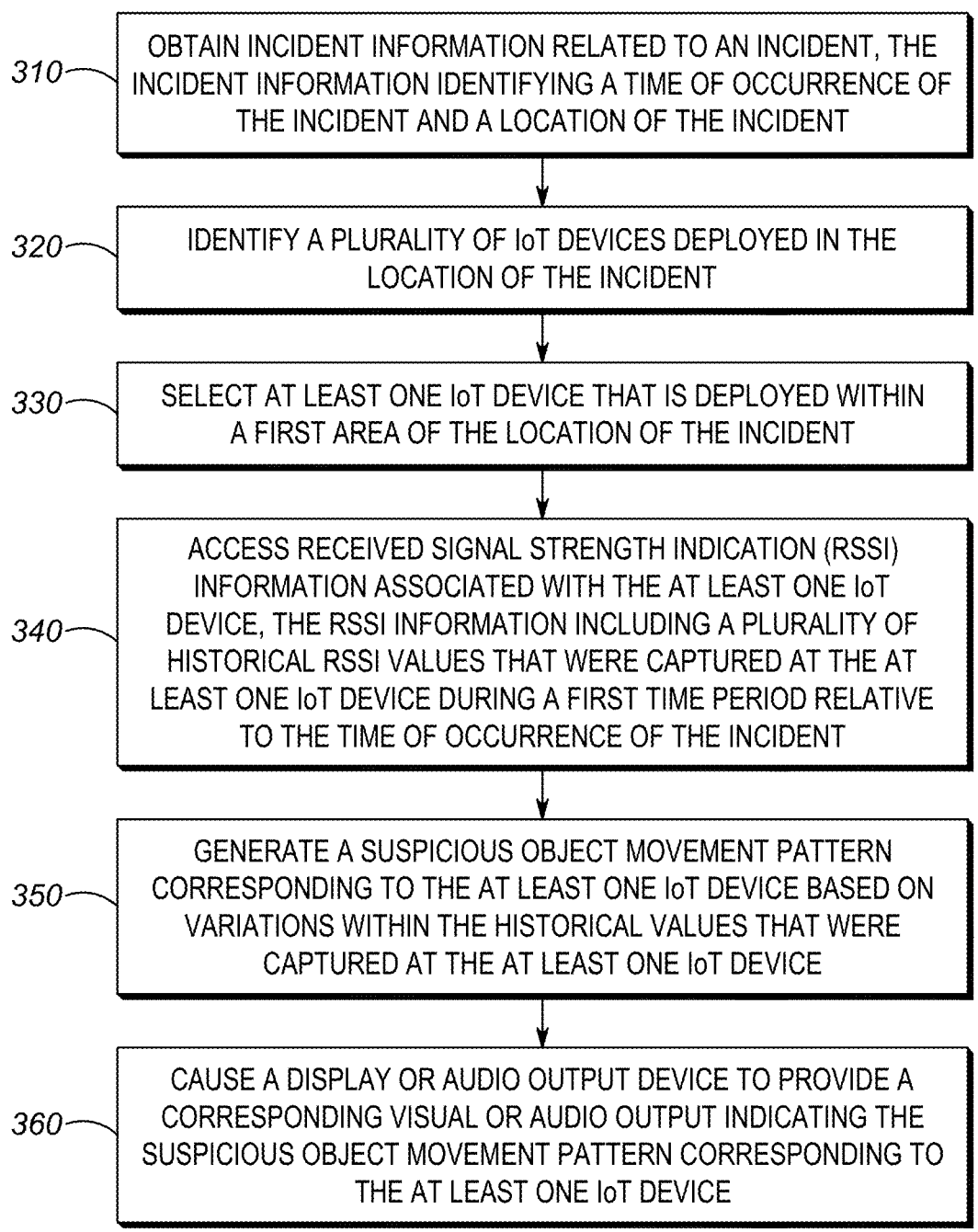
FIG. 3 illustrates a flow chart setting forth process blocks for identifying suspicious object movements in an incident location in accordance with some embodiments.

Turning now to FIG. 3, a flowchart diagram illustrates a process 300 for identifying suspicious object movements in an incident location. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. A corresponding electronic computing device, such as the electronic computing device 110 of FIG. 1 and/or the electronic computing device 200 of FIG. 2, and embodied as a singular electronic computing device or distributed electronic computing device may execute process 300. The electronic computing device may execute the process 300 at power-on, at some predetermined periodic time period thereafter, in response to a trigger raised locally at the device via an internal process or via an input interface (e.g., the user enabling a particular feature associated with the process 300 or the computing device detecting that the computing device or a user thereof has entered a particular incident scene), or in response to a trigger from a dispatch console (operated by a dispatcher) to which the electronic computing device is communicably coupled, among other possibilities.

The process 300 of FIG. 3 need not be performed in the exact sequence as shown and likewise various blocks may be performed in different order or alternatively in parallel rather than in sequence. Accordingly, the elements are referred to herein as "blocks" rather than "steps." The process 300 may be implemented on variations of the system 100 of FIG. 1 as well.

Process begins at block 310 where the electronic computing device obtains incident information related to an incident. The incident information identifies a time of occurrence of the incident and a location of the incident. In one embodiment, the electronic computing device obtains incident information in the form of structured electronic data via a dispatch console operated by a dispatcher. For example, when a public safety officer is assigned to investigate a reported incident, a communication device operated by the public safety officer may receive incident information related to an incident from the dispatcher. The incident information may include structured electronic data that includes data fields identifying incident identifier, location of the incident, type of the incident, time of occurrence of the incident etc. The incident information may also correspond to information obtained through sources such as surveillance cameras. In other embodiments, the communication device operated by the public safety officer may receive only general information (e.g., address of the incident) about the incident and therefore the public safety officer may need to obtain more specific information such as particular areas within the incident scene that need to be investigated, for example, based on conversations with potential witnesses to the incident.

In one embodiment, the electronic computing device processes unstructured natural language data such as conversations between the public safety officer and a potential witness to the incident to extract specific incident information such as a time of occurrence of the incident and location of the incident. In this embodiment, the electronic computing device captures real-time audio or video stream (e.g., via a corresponding audio and/or video capture device such as microphone 220 and/or imaging device 221) of conversations between the public safety officer and the witness. Next, the electronic computing device processes the captured real-time digital audio and/or video stream by converting the digital audio and/or video stream to a digital text string, which may include a text-based description of the audio and/or video from the audio and/or video stream captured from the conversations. For example, the text-based description may correspond to the auditory record of answers (to the questions posed by the public safety officer) provided by the witness and/or information provided by the officer. Additionally, or alternatively, the digital text stream may include text representative of the visual representation (e.g., sign language, hand written note etc.) of answers from the first user and/or information provided by the officer during the witness interview. The electronic computing device may then parse the digital text string using a natural language processing (NLP) engine to determine incident information such as the time of occurrence associated with the incident and/or location associated with the incident from the audio and/or video stream captured from the witness.

In any case, after the electronic computing device obtains incident information specifically identifying the time of occurrence of the incident and the location of the incident, the electronic computing device proceeds to block 320 to identify a plurality of IoT devices 130 deployed in the location of the incident. In one embodiment, the electronic computing device may receive user input identifying a list of IoT devices 130 along with the identifier of the IoT devices 130 that are deployed in the location of the incident. In another embodiment, the electronic computing device may query the RSSI information database 120 and/or other databases to identify the list of the IoT devices 130 along with the identifier of the IoT devices 130 that are deployed in the location of the incident. In another embodiment, the electronic computing device may broadcast a probe signal to request IoT devices 130 connected to a particular wireless router to respond with its identifier. In yet another embodiment, the electronic computing device may capture an image of a location of the incident using the imaging device 221 and may further analyze the image using object classifiers to identify specific objects representing IoT devices 130. Other possible ways of identifying IoT devices 130 that are deployed in a particular location exist as well.

Next, at block 330, the electronic computing device selects, from the plurality of IoT devices identified at block 320, at least one IoT device 130 that is deployed within a first area of the location of the incident. The first area may correspond to a specific area (e.g., kitchen, living room, bed room, basement, garage etc.,) within the incident location at which a specific event of interest (e.g. a loud sound indicating a possible break-in) associated with the incident might have happened. In one embodiment, the electronic computing device may identify that a particular area (first area) within the location of the incident is of interest for investigation (i.e., for identifying suspicious object movements) based on incident information extracted, via NLP engine, from the conversations between the public safety officer and the witness. For example, the witness might have indicated during the conversation that she heard some loud sound in the living area of the house. In this case, it is important to analyze whether any suspicious object movements have occurred in the living area of the house during a time frame the witness heard the loud sound. In any case, at block 330, the electronic computing device identifies a specific area that needs to be investigated for suspicious object movements and further selects one or more IoT devices 130 that are deployed within the specific area. As used herein, the term "object movements" correspond to one of (i) movement of the IoT device 130 (e.g., caused by an intruder) during the specific identified event associated with the incident, or (ii) movement of an unidentified object (e.g., a person, animal, or an automated machine) relative to (e.g., in proximity to) one or more IoT devices 130.

Next, at block 340, the electronic computing device accesses RSSI information associated with the selected IoT device 130. The RSSI information includes historical RSSI values that were captured at the selected IoT device 130 during a first time period relative to the time of occurrence of the incident. In one embodiment, after the electronic computing device determines the time of occurrence of the incident, for example, based on information extracted from the conversations between the public safety officer and witness, the electronic computing device determines a first time period relative to the time of occurrence of the incident for which the historical RSSI values associated with the selected IoT device 130 needs to be obtained. For example, when the time of occurrence of a specific event (e.g., loud sound) associated with the incident is known, say 6.00 PM, the electronic computing device may determine the first time period by including a predetermined time frame prior to the time of occurrence of the incident as well as a predetermined time frame after the time of occurrence of the incident. For example, if the predetermined time period prior to and after the time of occurrence of the incident is 5 minutes, then the electronic computing device will determine the first time period as 5:55 PM to 6:05 PM. In other words, in this case, the electronic computing device obtains historical RSSI values captured by the selected IoT device 130 between 5:55 PM and 6:05 PM. The selection of time frame prior to and after the time of occurrence of the incident for the purposes of obtaining historically captured RSSI values allows the electronic computing device to analyze the variations in the RSSI values that may be caused due to a change in the spatial position of the IoT device 130 (e.g., this may happen when an intruder intentionally or unintentionally moves a particular IoT device 130 at the time of the incident) or due to a movement of an unidentified external object (e.g., when the intruder passes by or moves back and forth relative to an IoT device 130).

The electronic computing device then proceeds to block 350 to generate a suspicious object movement pattern corresponding to the selected IoT device 130 based on variations within the historical RSSI values that were captured at the selected IoT device 130 during the first time period relative to the time of occurrence of the incident. In accordance with some embodiments, the electronic computing device analyzes the variations within the historical RSSI values in terms of the consistency in the variations of the RSSI values, fluctuations in the RSSI values, time duration of the fluctuation, difference between the initial RSSI value (i.e., RSSI value captured at the start of the first time period) and the final RSSI value (i.e., RSSI value captured at the end of the first time period). The variations in the RSSI values are analyzed using rule instructions (see FIG. 8) implemented at the electronic computing device to identify whether a particular historical RSSI pattern indicates a change in the spatial position (i.e., movement) of the IoT device 130 or a movement of an unidentified object relative to a position of the IoT device 130. As can be appreciated by a person skilled in the art, a change in the spatial position of the IoT device 130 may affect the signal strength corresponding to the signal received by the IoT device 130 from a wireless router and this in turn may affect the RSSI value captured at the IoT device 130. The signal strength may either drop or increase depending at least on the physical positions of the IoT device 130 and the wireless router and associated environmental factors. Similarly, when an object (e.g., a person) passes by the IoT device or moves back and forth relative to a position of the IoT device 130, a signal strength corresponding to a signal received by the IoT device 130 from the wireless may either drop or increase depending at least on the physical positions of the IoT device 130, the object, and the wireless router. Accordingly, the electronic computing device may determine a suspicious object movement pattern corresponding to the selected IoT device 130 based on the variations within the historical RSSI values associated with the selected IoT device 130.

In accordance with some embodiments, the generated suspicious object movement pattern may include information related to one or more of an incident identifier, historical RSSI values used to generate the suspicious object movement pattern, timestamp identifying a time at which the suspicious object movement was detected, identifier of the IoT device 130 corresponding to which the suspicious object movement was identified, location of the suspicious object movement (e.g., a representation of the area in which the selected IoT device 130 is deployed); type of suspicious object movement pattern selected from one of (i) a change in the spatial position of the IoT device 130 (referred to as IoT device 130 movement) or (ii) a movement of an unidentified object relative to a spatial position of the selected IoT device 130.

Next, at block 360, the electronic computing device causes a display (e.g., display 205) or audio output device (e.g., speaker 222) to provide a corresponding visual or audio output indicating the suspicious object movement pattern corresponding to the selected IoT device 130.

In accordance with embodiments, when multiple IoT devices 130 deployed in the first area are selected at block 330, the electronic computing device repeats the functions described in blocks 340 through 360 for each such selected IoT device 130. Similarly, when the electronic computing device identifies a second area of interest (e.g., kitchen) within the location of the incident based on identification of specific events (e.g., from processing the conversations) that likely happened in the second area of interest during the incident, the electronic computing device repeats the functions described in blocks 340 through 360 for selected IoT devices 130 deployed in the second area of the interest within the location of the incident.

In accordance with some embodiments, the electronic computing device collates the suspicious object movement pattern that is generated corresponding to each selected IoT device 130 and further generates a map representing different areas of the incident. The map may further include a visual representation of each selected IoT device 130 at its initial position (i.e., prior to the time of occurrence of the incident) as well as the visual representation of each selected IoT device 130 at its current position (e.g., after the time of occurrence of the incident). The map may also include visual representation of movement of unidentified objects relative to one or more IoT devices 130. A user interface provided at the electronic computing device may allow the user to select a particular time frame. When the particular time frame is selected, the electronic computing device automatically regenerates the map to show a current position of the selected IoT devices 130 as well as a status indicator indicating whether the particular IoT device 130 has changed its spatial position since the occurrence of the incident. The user interface may allow the user to select any area within the incident and the map view will automatically change to show the position and status of different IoT devices 130 as well as visual representation of unidentified objects that might have passed by a particular one or more IoT devices 130.

In one embodiment, the electronic computing device causes a display or audio output device to provide a corresponding visual or audio output indicating the change in the spatial position of the at least one IoT device 130 during the first time period when the type of incident corresponds to a first type of incident. For example, when the type of incident corresponds to an incident during which a loud sound was heard as captured from the witness statement, then the electronic computing device provides a visual or audio output to identify a list of IoT devices 130 (i.e., items within the household) that were moved and/or moved and placed back (which sometimes is not physically noticeable in case an intruder cleans up the incident scene and leaves no trace of the intruder's presence). In another embodiment, the electronic computing device causes the display or audio output device to provide a corresponding visual or audio output indicating the movement of an unknown object relative to the spatial position of the selected IoT device 130 during the first time period when the type of incident corresponds to a second type of incident. For example, when the electronic computing device determines that the incident is a break-in incident, then the electronic computing device may provide a visual or audio output to identify suspicious movement of unidentified external objects (e.g., an intruder). In this case, the electronic computing device may also identify the specific area or path of movement of the unidentified object based on the variations within the RSSI values of one or more IoT devices 130 deployed in the location of the incident. For example, the electronic computing device may visually highlight an area in the map (e.g., a particular path in proximity to specific IoT devices 130) to indicate the movement of the unidentified object.

Figure 4:
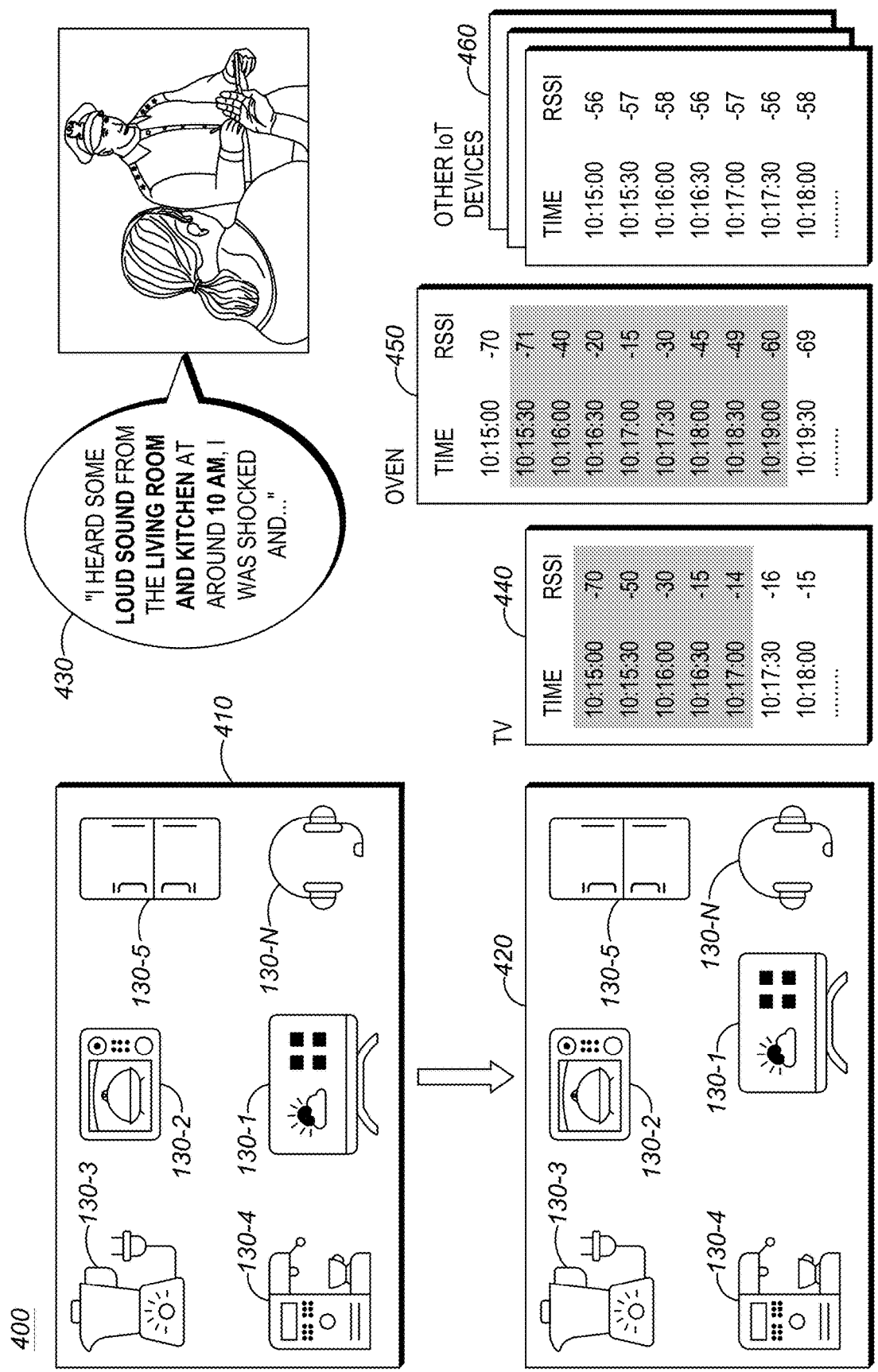
FIG. 4 illustrates an example scenario in which the embodiments described herein can be advantageously implemented to identify suspicious object movements and more particularly to identify IoT device movements during the time of occurrence of an incident.

FIG. 4 illustrates an example scenario 400 in which the embodiments described herein can be advantageously implemented to identify suspicious object movements and more particularly to identify IoT device 130 movements during the time of occurrence of an incident.

Assume that the example scenario 400 shown in FIG. 4 is related to a break-in incident that was reported at a house. Also, assume that a witness (e.g., a resident of the house) reported that she heard some loud sound from the living room and kitchen at around 10 AM. In this scenario 400, when the incident is reported, the electronic computing device may (and/or the officer may manually) be operated to extract incident information, for example, from conversation 430 between the officer and witness, identifying location of the incident and time of occurrence of the incident for the purpose of identifying suspicious object movements in the incident location. In this case, an electronic computing device (e.g., electronic computing device 110, 200) may process the conversation 430 "I heard some loud from the living room and kitchen at around 10 AM . . . " to extract the time of occurrence of the incident as "10 AM" and location of the incident as "living room" and "kitchen." Accordingly, the electronic computing device may process the historical RSSI values captured at the IoT devices 130 deployed in the living room as well as in the kitchen to identify the suspicious object movements. In particular, the electronic computing device may obtain the historical RSSI values that were particularly captured at the IoT devices 130 during a time frame (e.g., between 10:15 AM to 10:20 AM) relative to the time of occurrence of the incident, i.e., 10 AM The views of an incident scene (e.g., living room and kitchen) prior to and after the occurrence of an incident, for example, a break-in incident at the house is shown in FIG. 4. The view 410 shows the positions of the IoT devices 130 that are deployed at the incident scene prior to the occurrence of the incident. The view 420 shows the positions of the IoT devices 130 after the occurrence of the incident. In particular, the view 420 as represented in FIG. 4 indicates a change in the spatial position of a television (i.e., IoT device 130-1), for example, deployed in a living room of the house. In the case of the television (TV), an investigator may be able to determine that the television was moved during the time of occurrence of the incident. For example, the investigator may be able to obtain the prior positions of the television from the resident of the house and further may compare the physical positions of the television prior to and after the occurrence of the incident to find out that there is a spatial change in the position of the television. However, in case a particular item in the house is moved out and moved back to the previous position during the occurrence of the incident, an investigator may not be able to figure out whether the item is moved or not unless there is some physical evidence available to indicate that the item is moved. For example, assume that an intruder at the time of break-in moved the oven (i.e., IoT device 130-2) out and further moved the oven back to the original position. In this case, an electronic computing device implemented in accordance with the embodiments described herein is able to analyze the historical RSSI values associated with the oven at the time of break-in and further accurately determine whether the oven was moved or not.

As shown in FIG. 4, a snapshot 440 of the historical RSSI values associated with the television (i.e., IoT device 130-1) indicates that there is a variation within the RSSI values. In particular, there is a fluctuation in the RSSI values captured between 10:15:00 AM and 10:18:00 AM. The electronic computing device may determine that this fluctuation is due to the movement of the television. In addition, the electronic computing device also determines the estimated time at which the movement has occurred. For example, the change in the RSSI values indicates that the movement of television has happened between 10:15:00 AM to 10:18:00 AM. Also, since the final RSSI value "−15" captured at 10:18:00 AM is significantly different from initial RSSI value "−70" captured at 10:15:00 AM, the electronic computing device may determine that the television was moved out to a different place.

Further, as shown in FIG. 4, a snapshot 450 of the historical RSSI values associated with the oven (i.e., IoT device 130-2) indicates that there is a variation within the RSSI values. In particular, there is a fluctuation in the RSSI values captured between 10:15:00 AM and 10:19:30 AM. The electronic computing device may determine that this fluctuation is due to the movement of the oven. In addition, the electronic computing device also determines the estimated time at which the movement has occurred. For example, the change in the RSSI values indicates that the movement of oven has happened between 10:15:00 AM to 10:19:30 AM. Also, since the final RSSI value "−69" captured at 10:18:00 AM is not significantly different from initial RSSI value "−70" captured at 10:15:00 AM, the electronic computing device may determine that the oven was possibly moved back approximately to the original position. A snapshot 460 shown in FIG. 4 corresponding to another item, for example, a refrigerator (i.e., IoT device 130-5) indicates that there are small variations within the RSSI values. However, since the variations are small, the electronic computing device may not identify this as a suspicious movement unless the variations are inconsistent with the historical variations in the RSSI values captured at the refrigerator. In this manner, the electronic computing device may also determine if other items such as juicer (i.e., IoT device 130-3), coffee machine (i.e., IoT device 130-4), and headset (i.e., IoT device 130-n) in the living room/kitchen of the house have been moved and/or moved out to a different place during the time of occurrence of the incident based on the historical RSSI values respectively captured at the other IoT devices 130.

Figure 5:
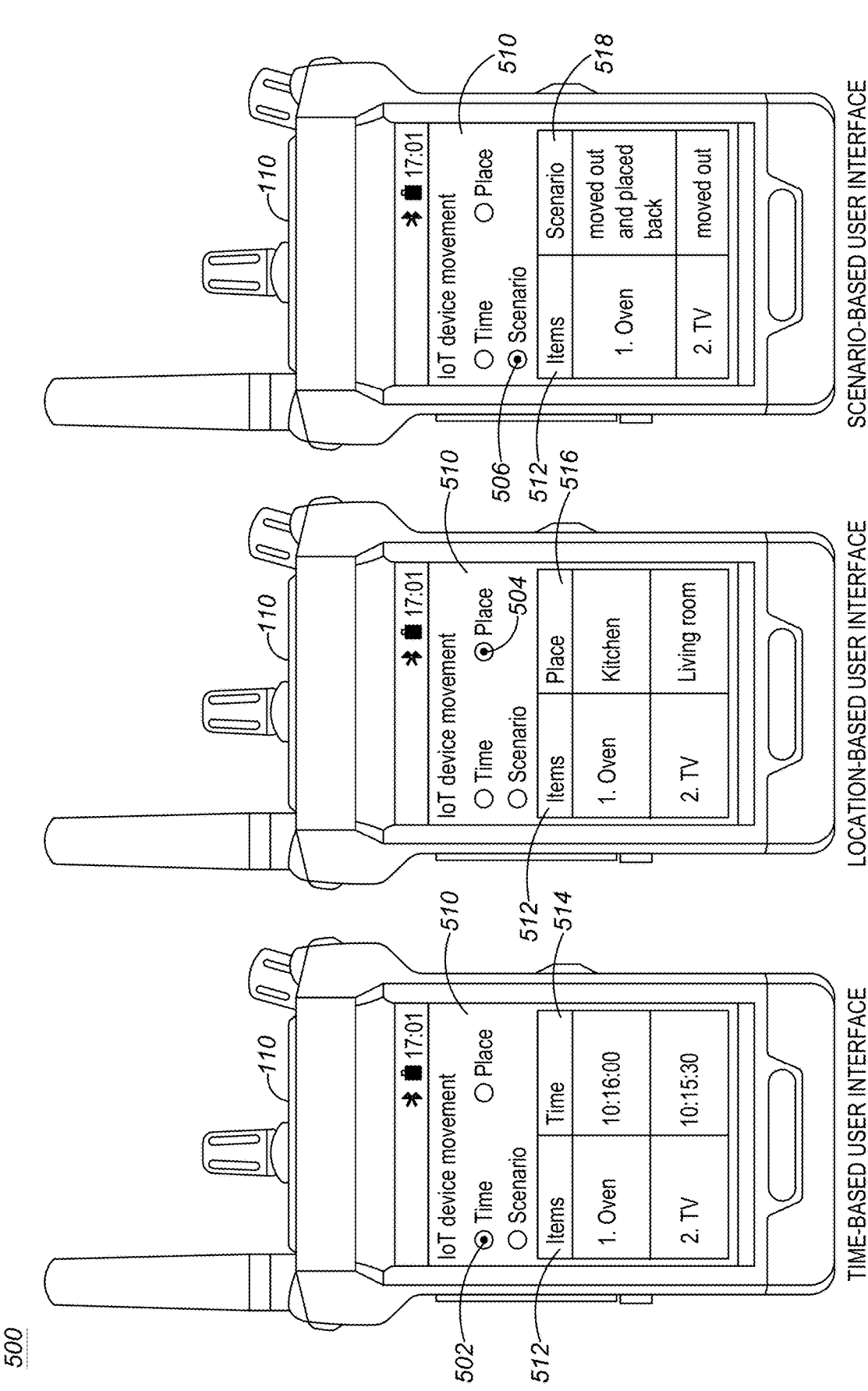
FIG. 5 illustrates a user interface displayed on a display of an electronic computing device to identify IoT devices that were moved during the time of occurrence of an incident according to one example embodiment.

FIG. 5 illustrates a diagram 500 depicting a user interface 510 displayed on a display (e.g., display 205) of an electronic computing device 110 to identify IoT devices 130 that were moved during the time of occurrence of an incident according to one example embodiment.

The user interface 510 shown in FIG. 5 displays a suspicious object movement pattern that is generated corresponding to the example incident scenario shown in FIG. 4. The user interface 510 shown in FIG. 5 includes a time-based user interface, a location-based user interface, and a scenario-based user interface. The electronic computing device 110 may generate one of the time-based user interface, location-based user interface, or scenario-based user interface in response to user input indicating selection of respective buttons 502, 504, or 506, for example, via the user input interface device 206 shown in FIG. 2. Each of the time-based user interface, location-based user interface, and scenario-based user interface displays a list of items 512 that were suspiciously moved during the incident. For example, with respect to the incident scenario 400 shown in FIG. 4, "oven" and "TV" are included within the list of items 512 that were suspiciously moved during the occurrence of an incident.

The time-based interface further displays a corresponding time field 514 indicating a time at which the respective items were first moved during the incident. In the example shown in FIG. 4, "oven" was first moved at "10:16:00" and "TV" was first moved at "10:15:00." The items may be further sorted within the time-based interface based on time of item movement. The location-based user interface further displays a corresponding place or location 516 at which the item that was detected as being moved during the incident was deployed. In the example shown in FIG. 5, "oven" was placed in the "kitchen" and "TV" was placed in the "living room." The items may be further sorted or grouped within the location-based interface based on location. Similarly, the scenario-based user interface identifies a type of movement or movement scenario 518 that was detected with respect to a particular item. In the example shown in FIG. 5, "oven" was "moved out and placed back" and "TV" was "moved out." The items may be sorted or grouped within the scenario-based interface based on particular type of movement.

Figure 6:
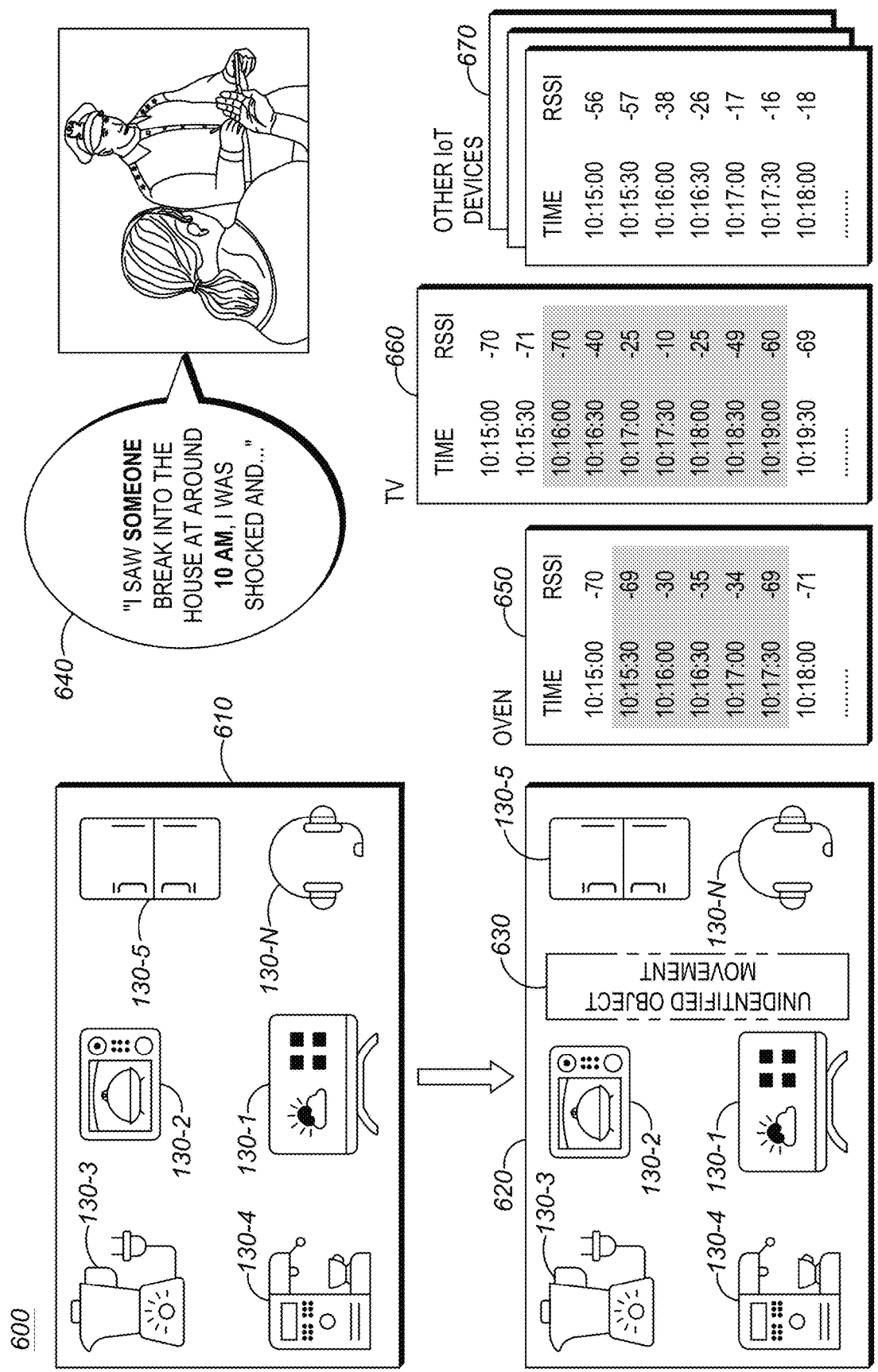
FIG. 6 illustrates another example scenario in which the embodiments described herein can be advantageously implemented to identify suspicious object movements and more particularly to identify unidentified object movements relative to particular IoT devices during the time of occurrence of an incident.

FIG. 6 illustrates another example scenario 600 in which the embodiments described herein can be advantageously implemented to identify suspicious object movements and more particularly to identify unidentified object movements relative to particular IoT devices 130 during the time of occurrence of an incident.

Assume that the example scenario 600 shown in FIG. 6 is related to a break-in incident that was reported at a house. Also, assume that a witness (e.g., a resident of the house) reported that she saw someone break into the house at around 10 AM. In this scenario, when the incident is reported, the electronic computing device may (and/or the officer may manually) be operated to extract incident information, for example, from conversation 640 between the officer and witness, identifying location of the incident and time of occurrence of the incident for the purpose of identifying suspicious object movements in the incident location. In this case, the electronic computing device may process the conversation 640 "I saw someone break into the house at around 10 AM . . . " to extract the time of occurrence of the incident as "10 AM" and location of the incident as "house." Accordingly, the electronic computing device may process the historical RSSI values captured at the IoT devices 130 deployed in the house to identify the suspicious object movements. In particular, the electronic computing device may obtain the historical RSSI values that were particularly captured at the IoT devices 130 during a time frame (e.g., between 10:15:00 AM to 10:19:30 AM) relative to the time of occurrence of the incident, i.e., 10 AM.

The views of an incident scene (e.g., house) prior to and after the occurrence of an incident, for example, a break-in incident at the house is shown in FIG. 6. The view 610 shows the positions of the IoT devices 130 that are deployed at the incident scene prior to the occurrence of the incident. The view 620 shows the positions of the IoT devices 130 after the occurrence of the incident. While there is no change in the positions of the IoT devices 130-1, 130-2, 130-3, 130-4, 130-5 prior to and after the occurrence of the incident, the view 620 represented in FIG. 6 indicates 630 that an unidentified object moved along a path in proximity to the IoT devices 130-1, 130-2 (i.e., oven and TV). In this case, since there is no trace of item (i.e., IoT device 130) movement at the incident scene, an investigator may not able to figure out whether any item in the house was moved or not unless there is some physical evidence available to indicate that the item was moved. In this case, an electronic computing device implemented in accordance with the embodiments described herein will be able to analyze the historical RSSI values associated with the respective items in the house at the time of break-in and further accurately determine whether there was any people or other unidentified object movements at the house at the time of break-in.

As shown in FIG. 6, a snapshot 650 of the historical RSSI values associated with the oven (i.e., IoT device 130-2) indicates that there is a variation within the RSSI values. In particular, there is a fluctuation in the RSSI values captured between 10:15:00 AM and 10:18:00 AM. The electronic computing device may determine that this fluctuation is due to an unidentified object (e.g., an intruder) passing by the oven. In addition, the electronic computing device also determines the estimated time corresponding to the unidentified object movement. Further, as shown in FIG. 6, a snapshot 660 of the historical RSSI values associated with TV (i.e., IoT device 130-1) indicates that there is a variation within the RSSI values. In particular, there is a fluctuation in the RSSI values captured between 10:15:00 AM and 10:19:30 AM. The electronic computing device may determine that this fluctuation is due to an unidentified object passing by the TV. In addition, the electronic computing device also determines the estimated time corresponding to the unidentified object movement. The electronic computing device similarly processes the RSSI values associated with other IoT devices 130 deployed in the house. A snapshot 670 shown in FIG. 6 corresponding to another item, for example, a refrigerator (i.e., IoT device 130-5) indicates that there are small variations within the RSSI values. In this case, the electronic computing device may determine that there are no suspicious object movements relative to the IoT device 130-5 because the variations within the RSSI values are minor.

Figure 7:
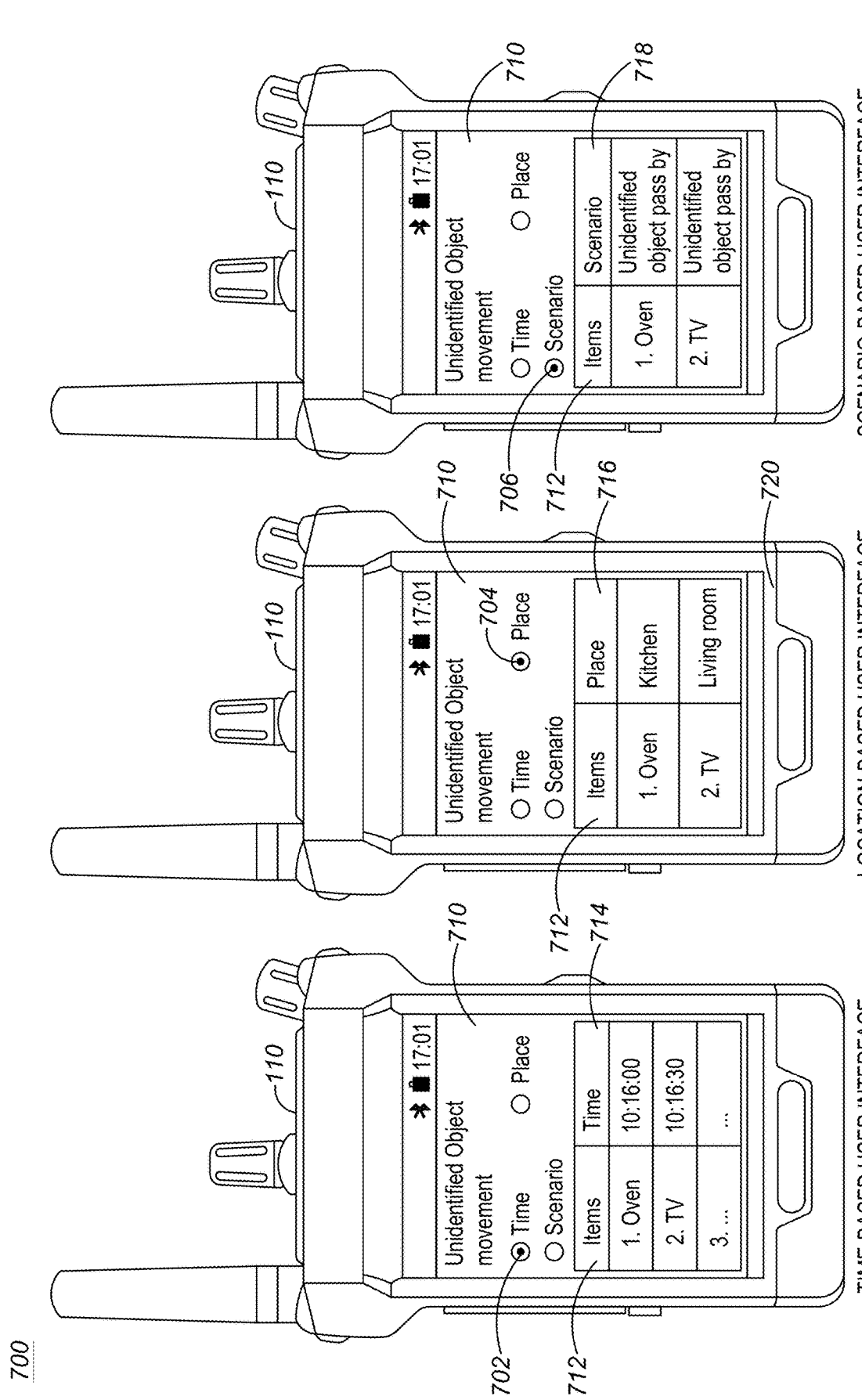
FIG. 7 illustrates a user interface displayed on a display of an electronic computing device to identify unidentified object movements relative to particular IoT devices during the time of occurrence of an incident according to another example embodiment.

FIG. 7 illustrates a user interface 700 displayed on a display (e.g., display 205) of an electronic computing device 110 to identify unidentified object movements relative to particular IoT devices 130 at the time of occurrence of an incident according to another example embodiment.

The user interface 710 shown in FIG. 5 displays a suspicious object movement pattern that is generated corresponding to the example incident scenario shown in FIG. 6. The user interface 710 shown in FIG. 7 includes a time-based user interface, a location-based user interface, and a scenario-based user interface. The electronic computing device 110 may generate one of the time-based user interface, location-based user interface, or scenario-based user interface in response to user input indicating selection of respective buttons 702, 704, or 706, for example, via the user input interface device 206 shown in FIG. 2. Each of the time-based user interface, location-based user interface, and scenario-based user interface displays a list of items 712 relative (e.g., in proximity to or along a path of one or more IoT devices 130) to which an unidentified object movement was detected at the time of occurrence of the incident. For example, with respect to the incident scenario 600 shown in FIG. 6, "oven" and "TV" are included within the list of items 712 relative to which an unidentified object movement was detected.

The time-based interface further displays a corresponding time field 714 indicating a time at which unidentified object movement was detected relative to the respective items. In the example shown in FIG. 6, unidentified object movement was first detected relative to the "oven" at "10:16:00" and unidentified object movement was first detected relative to the "TV" at "10:16:30." The location-based user interface further displays a corresponding place or location 716 at which the items, relative to which unidentified object movement was detected, was deployed. In the example shown in FIG. 7, "oven" was placed in the "kitchen" and TV was placed in the "living room." Similarly, the scenario-based user interface identifies a type of movement or movement scenario 718 that was detected with respect to a particular item. In the example shown in FIG. 7, an unidentified object passed by the oven as well as the TV.

In accordance with some embodiments, a combination of user-interfaces selected from time-based user interface, location-based user interface, and scenario-based user interface shown in FIGS. 5 and 7 are generated based on different user cases. For example, the time-based user interface and location-based user interface may be combined to form a common user interface, wherein items in the kitchen and living room are respectively sorted or grouped based on time of movement. As another example, the time-based user interface and scenario-based user interface may be combined to form a common user interface, wherein items that have same scenario (i.e., people passing by or people moving around) are arranged based on time. As yet another example, the location-based user interface and scenario-based user interface may be combined to form a common user interface, wherein items that have the same scenario will be grouped by different locations within each scenario. For example, among items that are being moved, each item is separately grouped under kitchen, living room, or bedroom, respectively.

Figure 8:
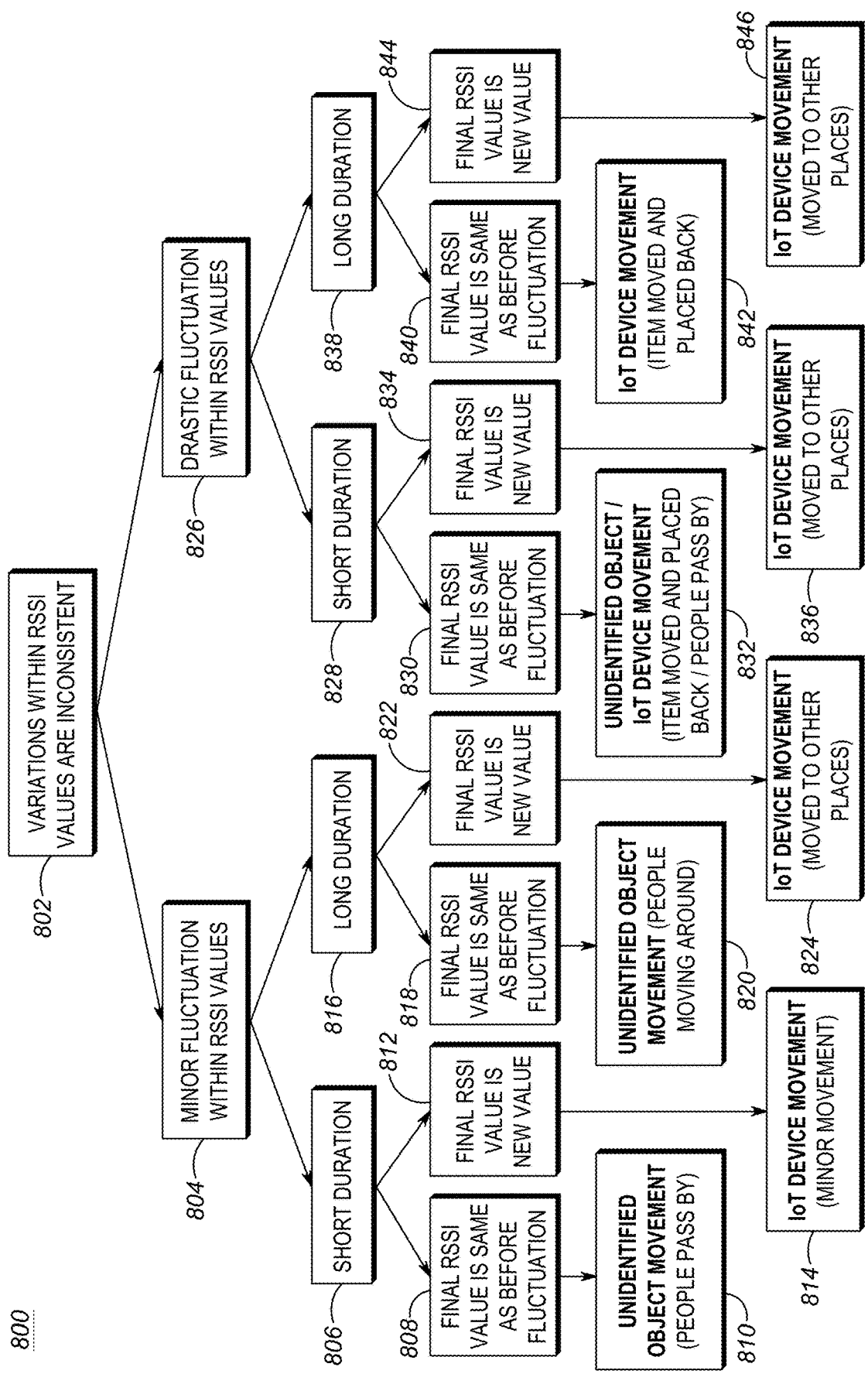
FIG. 8 illustrates application of rules for classifying a given RSSI pattern as an IoT device movement pattern and/or unidentified object movement pattern depending on variations within the historical RSSI values associated with the particular IoT device.

FIG. 8 is a diagram 800 illustrating application of rules for classifying a given RSSI pattern as an IoT device movement pattern and/or unidentified object movement pattern depending on variations within the historical RSSI values associated with the particular IoT device.

In accordance with embodiments described herein, an electronic computing device 110, 200 shown in FIG. 1 or FIG. 2 may apply the rules described herein with reference to FIG. 8 to determine whether a given historical RSSI pattern captured at an IoT device 130 corresponds to an IoT device 130 movement or an unidentified object movement. The rule shown in FIG. 8 may be stored in static memory 216 of the electronic computing device 110. When the electronic computing device obtains historical RSSI values captured at a particular IoT device 130 for a particular time period relative to the time of occurrence of the incident, the electronic computing device first determines whether variations within RSSI values are inconsistent 802. Any inconsistent changes in the RSSI values may provide a clue regarding suspicious object movements (IoT device 130 movement or unidentified external object) relative to the IoT device. In accordance with some embodiments, the electronic computing device may obtain, from the RSSI information database 120 shown in FIG. 1, information related to historical variations (e.g., variations during night time, during device operation, during non-operation etc.,) in the RSSI values captured at each IoT device 130 deployed at a particular location at different time points. The electronic computing device may then compare the variations detected within the historical RSSI values that are captured at a time period relative to the time of occurrence of the incident with the historical variations that are normally captured at the IoT device 130. If the comparison shows that the variations are consistent, then the electronic computing device may determine that there is no suspicious object movement corresponding to the IoT device 130.

On the other hand, if the comparison shows that the variations (i.e., change in RSSI values) are inconsistent (i.e., exceeding a tolerance), the electronic computing device further determines whether the historical RSSI values show minor fluctuation 804 or drastic fluctuation 826 in the values. In case of minor fluctuation 804, the RSSI values rise and fall back within the limit of tolerance over some period of time. As an instance, in case of minor fluctuation 804, the RSSI variation may exceed a low threshold value but is within a high threshold value for a period of time and then returns to the previous level. In case of drastic fluctuation 826, the RSSI values change to an extremely large or a small value. As an instance, in case of drastic fluctuation 826, the RSSI variation exceeds the high threshold value for a period of time before returning to the previous level. The RSSI fluctuation detection is compared on different time periods. For example, a baseline/idle period during which the fluctuation exceeds a low threshold value, a period when variation is above the low threshold value for a minimum of short duration, and a period after fluctuation is detected, i.e., after a short duration or a long duration.

The electronic computing device then determines whether minor fluctuation is detected for a short duration 806 (e.g., 2 seconds) or for a long duration 816 (e.g., greater than 1 minute). Further, the electronic computing device determines whether final RSSI value is same as the value that was captured before the fluctuation 808 or whether the final RSSI value is a new value 812. The electronic computing device may determine that historical RSSI pattern corresponds to an unidentified object movement 810 (e.g., people passing by) when the variations within RSSI values are inconsistent 802, there is minor fluctuation within RSSI values 804, the fluctuation is of short duration 806, and the final RSSI value is same as before fluctuation 808. Alternatively, the electronic computing device may determine that the historical RSSI pattern corresponds to an IoT device 130 movement 814 (e.g., minor movement) when the variations within RSSI values are inconsistent 802, there is minor fluctuation within RSSI values 804, the fluctuation is of short duration 806, and the final RSSI value is a new value 812. The electronic computing device may also determine that the historical RSSI pattern corresponds to an unidentified object movement 820 (e.g., people moving around) when the variations within RSSI values are inconsistent 802, there is minor fluctuation within RSSI values 804, the fluctuation is of long duration 816, and the final RSSI value is same as before fluctuation 818. Alternatively, the electronic computing device may determine that the historical RSSI pattern corresponds to an IoT device 130 movement 824 (e.g., IoT device 130 moved to another place) when the variations within RSSI values are inconsistent 802, there is minor fluctuation within RSSI values 804, the fluctuation is of long duration 816, and the final RSSI value is a new value 822.

Similarly, in case drastic fluctuation within RSSI values is detected, the electronic computing device proceeds to determine whether the fluctuation is of short duration 828 or long duration 838 and further whether the final RSSI value is same as before fluctuation 830, 840 or a new value 834, 844. The electronic computing device may determine that the historical RSSI pattern corresponds to an unidentified object movement and/or IoT device 130 movement 832 (e.g., item moved and placed back or people passing by) when the variations within RSSI values are inconsistent 802, there is drastic fluctuation within RSSI values 826, the fluctuation is of short duration 828, and the final RSSI value is same as before fluctuation 830. Alternatively, the electronic computing device may determine that the historical RSSI pattern corresponds to an IoT device 130 movement 836 (e.g., moved to other places) when the variations within RSSI values are inconsistent 802, there is drastic fluctuation within RSSI values 826, the fluctuation is of short duration 828, and the final RSSI value is a new value 834.

The electronic computing device may further determine that the historical RSSI pattern corresponds to an IoT device 130 movement 842 (e.g., item moved and placed back) when the variations within RSSI values are inconsistent 802, there is drastic fluctuation within RSSI values 826, the fluctuation is of long duration 838, and the final RSSI value is same as before fluctuation 840. Alternatively, the electronic computing device may determine that the historical RSSI pattern corresponds to an IoT device 130 movement 846 (e.g., item moved to another place) when the variations within RSSI values are inconsistent 802, there is drastic fluctuation within RSSI values 826, the fluctuation is of long duration 838, and the final RSSI value is a new value 844.

In accordance with embodiments described herein, systems, devices, and methods disclosed herein can be advantageously employed to identify suspicious object movements in an incident location. In particular, when no physical evidence (e.g., video recording, fingerprint etc.,) is available to detect movement of objects in an incident scene at the time of occurrence of the incident, an electronic computing device may be operated in accordance with the embodiments described herein to analyze variations within RSSI values that were historically captured at internet-of-things devices deployed at the incident scene and identify internet-of-things device movements and/or unidentified object movements relative to the internet-of-things devices. Embodiments described herein also automatically process conversations between public safety officers and witnesses to extract incident information identifying location and time of occurrence of the incident for the purposes of selecting internet-of-things devices corresponding to which historical RSSI values need to be analyzed for generating suspicious object movement pattern. Embodiments described herein also provide user interfaces that allow an investigator to readily view suspicious object movement pattern that is generated based on location, time, or movement scenario.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of identifying suspicious object movements in an incident location, the method comprising:
   obtaining, at an electronic computing device, incident information related to an incident, the incident information identifying a time of occurrence of the incident and a location of the incident;
   identifying, at the electronic computing device, a plurality of internet-of-things (IoT) devices deployed in the location of the incident;

selecting, at the electronic computing device, from the plurality of IoT devices, at least one IoT device that is deployed within a first area of the location of the incident;

accessing, at the electronic computing device, received signal strength indication (RSSI) information associated with the at least one IoT device, the RSSI information including a plurality of historical RSSI values that were captured at the at least one IoT device during a first time period relative to the time of occurrence of the incident;

generating, at the electronic computing device, a suspicious object movement pattern corresponding to the at least one IoT device based on variations within the historical RSSI values that were captured at the at least one IoT device during the first time period; and causing, at the electronic computing device, a display or audio output device to provide a corresponding visual or audio output indicating the suspicious object movement pattern corresponding to the at least one IoT device.

2. The method of claim 1, wherein the suspicious object movement pattern identifies one of (i) a change in a spatial position of the at least one IoT device during the first time period and (ii) a movement of an unidentified object relative to a spatial position of the at least one IoT device during the first time period.

3. The method of claim 2, wherein the incident information further includes a type of the incident, the method further comprising:

causing the display or audio output device to provide a corresponding visual or audio output indicating the change in the spatial position of the at least one IoT device during the first time period when the type of the incident corresponds to a first type of incident; and causing the display or audio output device to provide a corresponding visual or audio output indicating the movement of an unidentified object relative to the spatial position of the at least one IoT device during the first time period when the type of incident corresponds to a second type of incident.

4. The method of claim 2, wherein the suspicious object movement pattern corresponding to the at least one IoT device further identifies the first area of the location of the incident at which the at least one IoT device is deployed and a timestamp at which the change in the spatial position of the at least one IoT device has occurred within the first time period.

5. The method of claim 1, further comprising:

selecting, from the plurality of IoT devices, at least one other IoT device that is deployed within a second area of the location of the incident; and accessing received signal strength indication (RSSI) information associated with the at least one other IoT device, the RSSI information including a plurality of historical RSSI values that was captured at the at least one other IoT device during the first time period relative to the time of occurrence of the incident;

generating a suspicious object movement pattern corresponding to the at least one other IoT device based on variations between the historical RSSI values that were captured at the at least one other IoT device during the first time period, the suspicious object movement pattern identifying one of (i) a change in a spatial position of the at least one other IoT device during the first time period and (ii) a movement of an unidentified object relative to a spatial position of the at least one other IoT device during the first time period; and causing a display or audio output device to provide a corresponding visual or audio output indicating the suspicious object movement pattern corresponding to the at least one other IoT device.

6. The method of claim 5, wherein the suspicious object movement pattern corresponding to the at least one other IoT device further identifies the second area of the location of the incident at which the at least one IoT device is deployed and a timestamp at which the change in the spatial position of the at least one other IoT device has occurred within the first time period.

7. The method of claim 1, further comprising:

processing, via a natural language processing engine, unstructured natural language data including conversations between a public safety officer responding to the incident and a potential witness of the incident; and identifying the time of occurrence of the incident and the location of the incident based on processing the unstructured natural language data.

8. The method of claim 1, wherein accessing comprises:

transmitting a request to a RSSI information database to obtain access to the RSSI information, the request including information related to an identifier of the at least one IoT device, the first time period during which RSSI information needs to be accessed, and credential of the electronic computing device; and receiving access to the RSSI information associated with the at least one IoT device.

9. The method of claim 1, further comprising:

transmitting the suspicious object movement pattern to an evidentiary repository.

10. The method of claim 1, wherein selecting comprises:

receiving a user input indicating a selection of the at least one IoT device from the plurality of IoT devices.

11. The method of claim 1, wherein the historical RSSI values were captured by the at least one IoT device based on estimated signal strength corresponding to respective signals received from a wireless router deployed at the location of the incident.

12. An electronic computing device, comprising:

a communication interface; and an electronic processor communicatively coupled to the communication interface, wherein the electronic processor is configured to:

obtain incident information related to an incident, the incident information identifying a time of occurrence of the incident and a location of the incident;

identify a plurality of internet-of-things (IoT) devices deployed in the location of the incident;

select, from the plurality of IoT devices, at least one IoT device that is deployed within a first area of the location of the incident;

access received signal strength indication (RSSI) information associated with the at least one IoT device, the RSSI information including a plurality of historical RSSI values that were captured at the at least one IoT device during a first time period relative to the time of occurrence of the incident;

generate a suspicious object movement pattern corresponding to the at least one IoT device based on variations within the historical RSSI values that were captured at the at least one IoT device during the first time period; and cause a display or audio output device to provide a corresponding visual or audio output indicating the suspicious object movement pattern corresponding to the at least one IoT device.

13. The electronic computing device of claim 12, wherein the suspicious object movement pattern identifies one of (i) a change in a spatial position of the at least one IoT device during the first time period and (ii) a movement of an unidentified object relative to a spatial position of the at least one IoT device during the first time period.

14. The electronic computing device of claim 13, wherein the incident information further includes a type of the incident and wherein the electronic processor is further configured to:
cause the display or audio output device to provide a corresponding visual or audio output indicating the change in the spatial position of the at least one IoT device during the first time period when the type of the incident corresponds to a first type of incident; and
cause the display or audio output device to provide a corresponding visual or audio output indicating the movement of an unidentified object relative to the spatial position of the at least one IoT device during the first time period when the type of incident corresponds to a second type of incident.

15. The electronic computing device of claim 14, wherein the suspicious object movement pattern corresponding to the at least one IOT device further identifies the first area of the location of the incident at which the at least one IoT device is deployed and a timestamp at which the change in the spatial position of the at least one IoT device has occurred within the first time period.

16. The electronic computing device of claim 13, wherein the electronic processor is further configured to:
select, from the plurality of IoT devices, at least one other IoT device that is deployed within a second area of the location of the incident; and
access received signal strength indication (RSSI) information associated with the at least one other IoT device, the RSSI information including a plurality of historical RSSI values that was captured at the at least one other IoT device during the first time period relative to the time of occurrence of the incident;
generate a suspicious object movement pattern corresponding to the at least one other IoT device based on variations between the historical RSSI values that were captured at the at least one other IoT device during the first time period, the suspicious object movement pattern identifying one of (i) a change in a spatial position of the at least one other IoT device during the first time period and (ii) a movement of an unidentified object relative to a spatial position of the at least one other IoT device during the first time period; and
cause a display or audio output device to provide a corresponding visual or audio output indicating the suspicious object movement pattern corresponding to the at least one other IoT device.

17. The electronic computing device of claim 16, wherein the suspicious object movement pattern corresponding to the at least one other IoT device further identifies the second area of the location of the incident at which the at least one IoT device is deployed and a timestamp at which the change in the spatial position of the at least one other IoT device has occurred within the first time period.

18. The electronic computing device of claim 13, wherein the electronic processor is further configured to:
process, via a natural language processing engine, unstructured natural language data including conversations between a public safety officer responding to the incident and a potential witness of the incident; and
identify the time of occurrence of the incident and the location of the incident based on processing the unstructured natural language data.

19. The electronic computing device of claim 13, wherein the electronic processor is further configured to:
transmit, via the communication interface, a request to a RSSI information database to obtain access to the RSSI information, the request including information related to an identifier of the at least one IoT device, the first time period during which RSSI information needs to be accessed, and credential of the electronic computing device; and
receive, via the communication interface, access to the RSSI information associated with the at least one IoT device.

20. The electronic computing device of claim 13, wherein the electronic processor is further configured to:
transmit, via the communication interface, the suspicious object movement pattern to an evidentiary repository.

* * * * *